US007016568B2

(12) United States Patent
Van Weerden et al.

(10) Patent No.: US 7,016,568 B2
(45) Date of Patent: Mar. 21, 2006

(54) ARRAYED WAVEGUIDE GRATING WITH INCREASED UNIFORMITY OF A PERFORMANCE PARAMETER

(76) Inventors: Harm Van Weerden, c/o Kymata Netherlands B.V. Colleusseom 11, NL-7521 PV Enschede (NL); Hindrik Freerk Bulthuis, c/o Kymata Netherlands B.V. Colleusseom11, NO-7521 PV Enschede (NL); Richard Ian Laming, c/o Alcatel Optronics UK Limited Starlaw Park, Starlaw Road, Livingston (GB) EH54 8SF (*) Notice: Subject to any disclaimer, the term of this patent is extended or adjusted under 35 U.S.C. 154(b) by 0 days.

(21) Appl. No.: 10/471,420

(22) PCT Filed: Mar. 11, 2002

(86) PCT No.: PCT/GB02/01087

§ 371 (c)(1),
(2), (4) Date: Mar. 5, 2004

(87) PCT Pub. No.: WO02/073270

PCT Pub. Date: Sep. 19, 2002

(65) Prior Publication Data
US 2004/0131313 A1   Jul. 8, 2004

(30) Foreign Application Priority Data
Mar. 12, 2001   (GB) .................................. 0106014

(51) Int. Cl.
    G02B 6/34   (2006.01)
(52) U.S. Cl. ............................ 385/37; 385/15; 385/31; 385/39; 385/46
(58) Field of Classification Search ................. 385/31, 385/37, 43, 46
    See application file for complete search history.

(56) References Cited

U.S. PATENT DOCUMENTS

| 5,625,723 A | 4/1997 | Dragone et al. ............... 385/11 |
| 5,852,505 A | 12/1998 | Li ............................... 398/68 |

(Continued)

FOREIGN PATENT DOCUMENTS

JP   07 333447   12/1995

(Continued)

OTHER PUBLICATIONS

Okamoto, K. et al., "Fabrication of Unequal Channel Spacing Arrayed-waveguide Grating Multiplexer Modules," *Electronics Letters*, Aug. 17, 1995, vol. 31, No. 17, pp. 1464-1466.

Primary Examiner—Frank G. Font
Assistant Examiner—Derek L. Dupuis

(57) ABSTRACT

An arrayed waveguide grating (AWG) device (1) comprising a substrate having a first array of waveguides (8) optically coupled between first and second slab couplers (3, 4) and a second array of input-output waveguides (10) optically coupled at first ends thereof to an input/output side (5) of the second slab-coupler (4). The input/output waveguide are tapered at first end portions (13) thereof so as to increase in width towards the second slap coupler, and the width (W) of the first ends of the input/output waveguides varies across the second array (10) in a manner so as to increase uniformity of at least on performance parameter, for example adjacent crosstalk (AXT). In the described embodiment, the width (W) of the tapered waveguide ends increases from one side to the array of input/output waveguides (10) to the other, so as to keep the separation (s) between the input/output waveguides.

11 Claims, 3 Drawing Sheets

U.S. PATENT DOCUMENTS

| | | | |
|---|---|---|---|
| 5,889,906 A | 3/1999 | Chen | 385/28 |
| 5,926,298 A | 7/1999 | Li | 385/27 |
| 5,926,587 A | 7/1999 | Chen et al. | 385/14 |
| 5,930,419 A | 7/1999 | Marcel | |
| 6,058,233 A | 5/2000 | Dragone | 385/46 |
| 6,118,909 A | 9/2000 | Chen et al. | 385/15 |
| 6,188,818 B1 * | 2/2001 | Han et al. | 385/24 |
| 6,205,273 B1 * | 3/2001 | Chen | 385/37 |
| 6,463,197 B1 | 10/2002 | Dragone | 385/50 |

FOREIGN PATENT DOCUMENTS

| | | |
|---|---|---|
| JP | 08201737 A * | 8/1996 |

* cited by examiner

ARRAYED WAVEGUIDE GRATING WITH INCREASED UNIFORMITY OF A PERFORMANCE PARAMETER

The present invention relates to an improved arrayed waveguide grating (AWG) device.

In order to meet the ever-increasing demand for transmission bandwidth in communication networks, operators are investing heavily in the development of techniques for Dense Wavelength Division Multiplexing (DWDM). DWDM employs many closely spaced carrier wavelengths, multiplexed together onto a single waveguide such as an optical fibre. The carrier wavelengths are spaced apart by as little as 50 GHz in a spacing arrangement designed for an ITU (International Telecommunications Union) channel "grid". Each carrier wavelength may be modulated to provide a respective data transmission channel, By using many channels, the data rate of each channel can be kept down to a manageable level.

Clearly, to utilize this available bandwidth it is necessary to be able to separate, or demultiplex, each channel at a receiver. New optical components for doing this have been designed for this purpose, one of these being the Arrayed Waveguide Grating (AWG). An AWG is a planar structure comprising a number of array waveguides which together act like a diffraction grating in a spectrometer. AWGs can be used as multiplexers and as demultiplexers, and a single AWG design can commonly be used both as a multiplexer and demultiplexer. A typical AWG mux/demux 1 is illustrated in FIGS. 1 and 2 and comprises a substrate or "die" 1 having provided thereon at least one input waveguide 2 for a multiplexed input signal, two "slab" or "star" couplers 3,4 connected to either end of an arrayed waveguide grating consisting of an array of transmission waveguides 8, only some of which are shown, and a plurality of single mode output waveguides 10 (only some shown) for outputting respective wavelength channel outputs from the second (output) slab coupler 4 to the edge 12 of the die 1. In generally known manner, there is a constant predetermined optical path length difference between the lengths of adjacent waveguides 8 in the array which determines the position of tie wavelength output channels on the output face 5 of the second slab coupler 4. Typically, the physical length of the waveguides increases incrementally by the same amount, ΔL, from one waveguide to the next, where $$\Delta L = m\lambda_c/n_c$$

where $\lambda_c$ is the central wavelength of the grating, $n_c$ is the effective refractive index of the array waveguides, and m is an integer number. In known manner, the waveguides and slab couplers are typically formed as "cores" on a silicon substrate (an oxide layer is commonly provided on the substrate prior to forming the cores thereon) and are covered in a cladding material, this being done for example by Flame Hydrolysis Deposition (FHD) or Chemical Vapour Deposition (CVD) fabrication processes.

The construction and operation of such AWGs is well known in the arts See for example, "PHASAR-based WDM-Devices: Principles, Design and Applications", M K Smit, IEEM Journal of Selected Topics in Quantum Electronics Vol.2, No.2, June 1996. Commonly, the end portions 13 of the output and/or input waveguides may be adiabatically tapered in width where they are coupled to the respective slab coupler 3,4, so as to widen towards the coupler, as illustrated in FIG. 2. (Only four of the output waveguides 10 are shown FIG. 2, for clarity). This tends to improve the overall performance of the device, largely due to better mode coupling between the slab couplers and the input/output waveguides. In other embodiments there are no input waveguides: instead, the first slab coupler 3 is arranged at the edge of the die 1, so that an input signal can be launched directly into the slab.

One problem with AWGs is that of keeping crosstalk between adjacent channels as low as possible. Such "adjacent crosstalk", hereinafter referred to as AXT, is detrimental to the performance of the AWG device. Commonly, in the above-described AWG devices, the spacing or "pitch" between adjacent ones of the output waveguides (i.e. from optical axis to optical axis) is not uniform across all the output waveguides, In fact, the pitch is usually gradually increased from the lowest frequency (channel) output waveguide to the highest frequency (channel) output waveguide. This is because the positions of the different wavelengths imaged on the output face 5 of the output slab coupler are not uniformly spaced, this being due to the non-linearity of the function which defines the positions of the is channel wavelengths on the output face of the slab coupler. It is highly desirable to the users of such AWG devices (e.g. network providers) for the AWG to have a constant channel spacing in the frequency domain. Designers therefore commonly "chirp" the pitch of the output waveguides according to the predicted positions of the desired output channel signals on the output face 5 of the output slab coupler, in order that the output channels are equally spaced in the frequency domain.

In the above-mentioned common case where tapers are provided on the ends of the output waveguides which are coupled to the output slab coupler, the tapers are usually all identical in shape and size, the taper width adjacent the output slab being designed for the central channel of the output waveguide array. Where the pitch between such tapered output waveguides is chirped across the output waveguide array, for example the pitch may vary from 19.4 μm for channel 1 to 18.6 μm for channel 40 in a 40 channel AWG, we have found experimentally that there is a deviation of the AXT from the "designed for value" of AXT, across the array of output waveguides. We have found that there is an approximately linear dependence of actual AXT with channel number. Thus, the AXT for the lowest frequency channel (channel 1) will be lowest (i.e. best), while the AXT of the highest frequency channel (channel 40) will be highest (i.e. worst). As the overall AXT value for the AWG is determined by the worst-case value, this results in an increased ART as compared with the designed value.

We believe this slope in the AXT value is related to the chirping of the output waveguide pitch which is used to obtain a constant channel spacing in the frequency domain.

The chirped pitch between output waveguides can also lead to non-uniformity in other performance parameters of the AWG, across the output channels. For example, non-uniformity in one or more of: the channel bandwidth (BW); Polarisation dependent loss (PDL); insertion loss (IL); passband uniformity (PBU).

An aim of the present invention is to avoid or minimize one or more of the foregoing disadvantages.

According to a first aspect of the invention there is provided an arrayed waveguide grating (AWG) device comprising:

a substrate having first and second slab couplers;

a first array of waveguides optically coupled between the first and second slab couplers and having respective predetermined optical path length differences therebetween;

a second array of waveguides optically coupled at first ends thereof to an input/output side of the second slab coupler, the waveguides of the second array being substantially tapered at first end portions thereof so as to increase in width towards the second slab coupler; wherein the width of the first ends of the waveguides varies across the second array in a manner so as to increase uniformity of at least one performance parameter across the second array of waveguides.

Most preferably, the width of the first ends of the waveguides varies across the second array in a manner so as to substantially equalize at least one performance parameter across the second array of waveguides.

Preferably, the width of the first ends of the waveguides varies across the second array in a manner so as to substantially equalize adjacent crosstalk (AXT) across the second array of waveguides. Preferably, the pitch between adjacent waveguides of the second array varies across the second array and the width of said first ends of the waveguides preferably varies across the second array so as to keep the separation between said first ends substantially constant, whereby variation in AXT between the waveguides of the second array caused by said variation in pitch thereof is substantially compensated for.

AXT is the most pronounced performance parameter affected by variation of the pitch of the output waveguide. Thus, the invention has the advantage of allowing a reduction of the worst-case AXT to be achieved, as compared with the worst-case AXT of the described prior devices in which all the tapers on the output waveguides are of identical width.

Alternatively, or additionally, the width of the first ends of the waveguides may vary across the second array in a manner so as to substantially equalize, or at least increase uniformity in, at least one other performance parameter across the second array of waveguides, for example one or more of BW, PDL, L and PBU.

It will be appreciated that the waveguides of the second array will be used as output or input waveguides, depending on whether the AWG device is used as a demultiplexer or a multiplexer respectively. Preferably, each waveguide of the second array (hereinafter referred to as "each input/output waveguide") is adiabatically tapered at the first end portion thereof. Alternatively, other forms of taper in which the width of tile waveguide increases towards the slab coupler are possible, for example parabolic tapers (sometimes referred to as "parabolic horns") as described in JP 09297228A. In other possible embodiments the input/output waveguides may be substantially tapered in the sense that they widen towards the slab coupler in non-continuous fashion. For example there may be an MMI (Multi-Mode Interference) device provided in the first end of each input/output waveguide, coupled to the second slab coupler, such as described in U.S. Pat. No. 5,629,992. In another possibility a Y-branch may be provided in the first end of each input/output waveguide, coupled to the second slab coupler, as described in U.S. Pat. No. 5,412,744. In all of these described embodiments, in accordance with the invention the width of the first ends of the input/output waveguides, optically coupled to the input/output side of the second slab, is varied across the array of input/output waveguides so as to substantially equalize, or at least increase uniformity in, at least one performance parameter, for example AXT, across the second array of waveguides.

Preferably, the width of the first ends of the input/output waveguides increases from one side of the second waveguide array to the other. Most preferably, the pitch between adjacent input/output waveguides decreases from the lowest frequency channel input/output waveguide to the highest frequency channel input/output waveguide, and the width of the first ends of the input/output waveguides decreases accordingly from said lowest to said highest frequency channel input/output waveguide, so as to substantially compensate for variation in AXT caused by the variation in pitch of adjacent input/output waveguides.

Preferably, the output waveguides are all single-mode, or substantially single-mode, waveguides.

The AWG device may further include at least one input/output waveguide optically coupled at a first end thereof to an input/output side of the first slab coupler. An array of such input/output waveguides may be optically coupled at first ends thereof to the input/output side of the first slab coupler, the pitch of these input/output waveguides being varied across the array, and the waveguides being substantially tapered at first end portions thereof, in which case the width of said first ends thereof may also be varied so as to substantially equalize, or at least improve uniformity in, at least one performance parameter across all the input waveguides. This may be advantageous where the AWG device is, for example, to be used as a router.

According to another aspect of the invention there is provided a method of designing an AWG device comprising the steps of; providing a substrate;

providing on the substrate first and second slab couplers, a first array of waveguides optically coupled between the first and second slab couplers and having respective predetermined optical path length differences therebetween, and a second array of waveguides optically coupled at first ends thereof to an input/output side of the second slab coupler, wherein the waveguides of the second array are substantially tapered at first end portions thereof so as to increase in width towards the second slab coupler, and the width of said first ends of the waveguides is varied across the second array so as to increase uniformity of, and preferably substantially equalize, at least one performance parameter, for example AXT, across the second array of waveguides.

The pitch between adjacent waveguides of the second array may also be varied across the second array, in which case the width of said first ends of the waveguides is preferably varied across the second array so as to substantially equalize AXT across the second array of waveguides. This may be substantially achieved by keeping the separation between said first ends substantially constant, whereby variation in AXT between the waveguides of the second array caused by said variation in pitch thereof is substantially compensated for.

According to a further aspect of the invention there is provided a multiplexer/demultiplexer comprising an AWG as above-described.

According to another aspect of the invention, as shown in FIG. 5. there is provided a communications system 510 incorporating at least one AWG device 512 as above-described.

Preferred embodiments of the invention will now be described by way of example only and with reference to the accompanying drawings in which:

FIG. 4 illustrates schematically three output waveguides of an AWG according to the.

Figure 1:
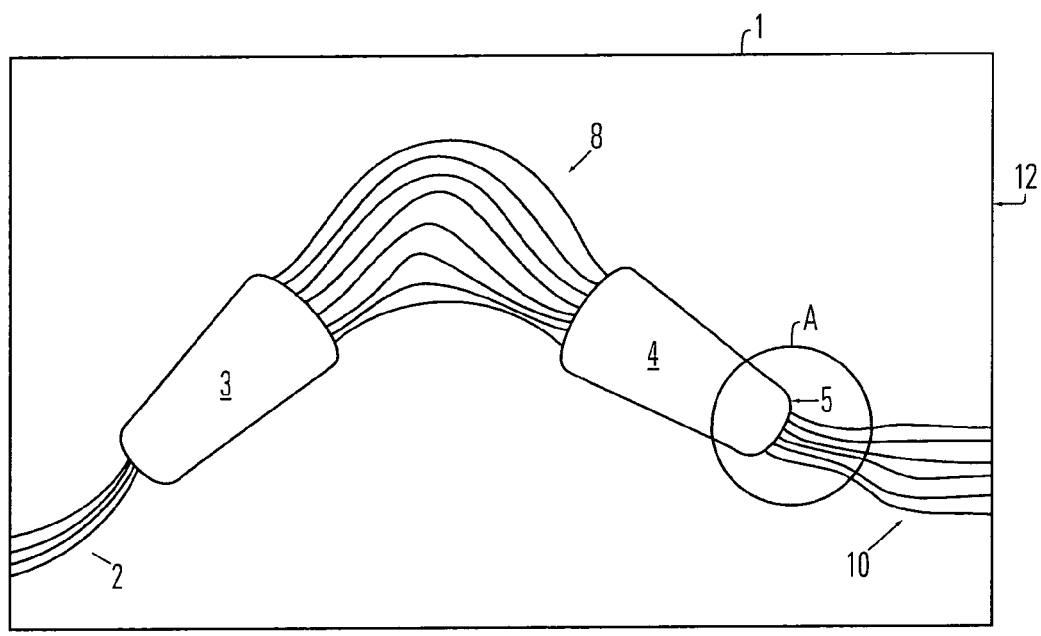
FIG. 1 is a schematic plan view of a known AWG device.
Figure 2:
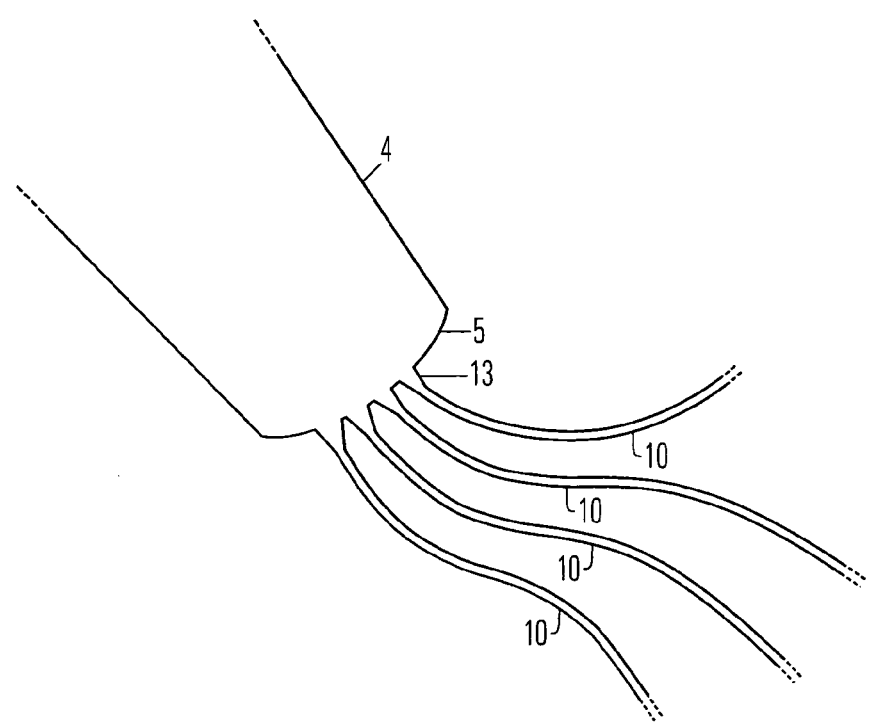
FIG. 2 is a magnified view of the ringed portion A of FIG. 1.
Figure 3:
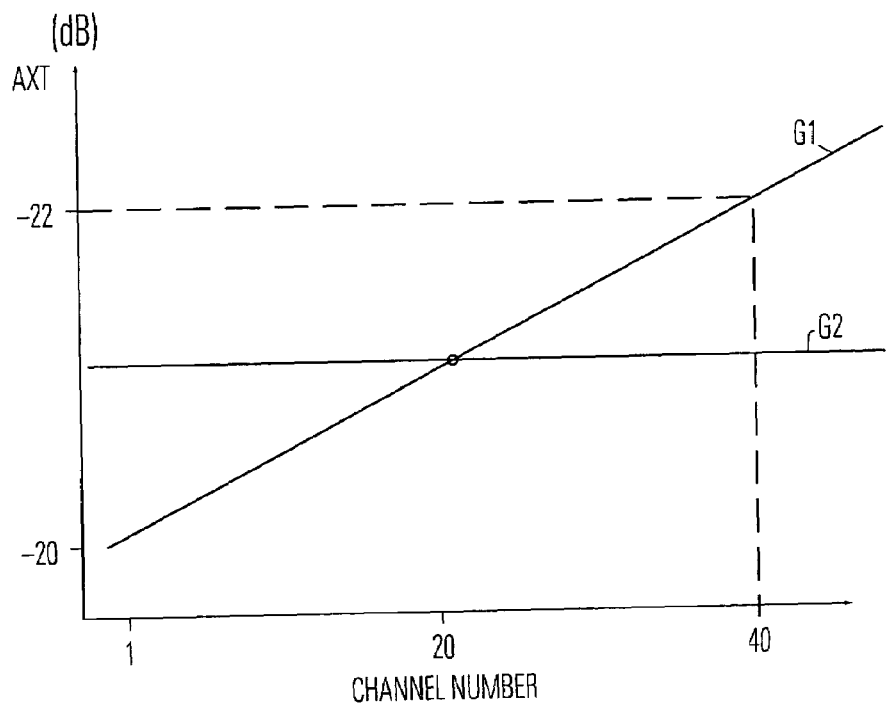
FIG. 3 is a graph illustrating AXT against AWG channel number.

The sloped graph G1 in FIG. 3 illustrates the variation in crosstalk which we have found in a 40 channel AWG of the type illustrated in FIGS. 1 and 2, in which the output waveguide pitch (d) increases across the output waveguide array and the output waveguides 10 are each identically tapered at the end portions 13 thereof which are coupled to the second slab coupler 4. As shown, the AXT increases generally linearly from the lowest frequency output channel (channel 1) up to the highest frequency channel (i.e. channel 40 in a 40 channel AWG), the variation in AXT in the example illustrated in FIG. 3 being from about −25 dB to about −22 dB.

Figure 4:
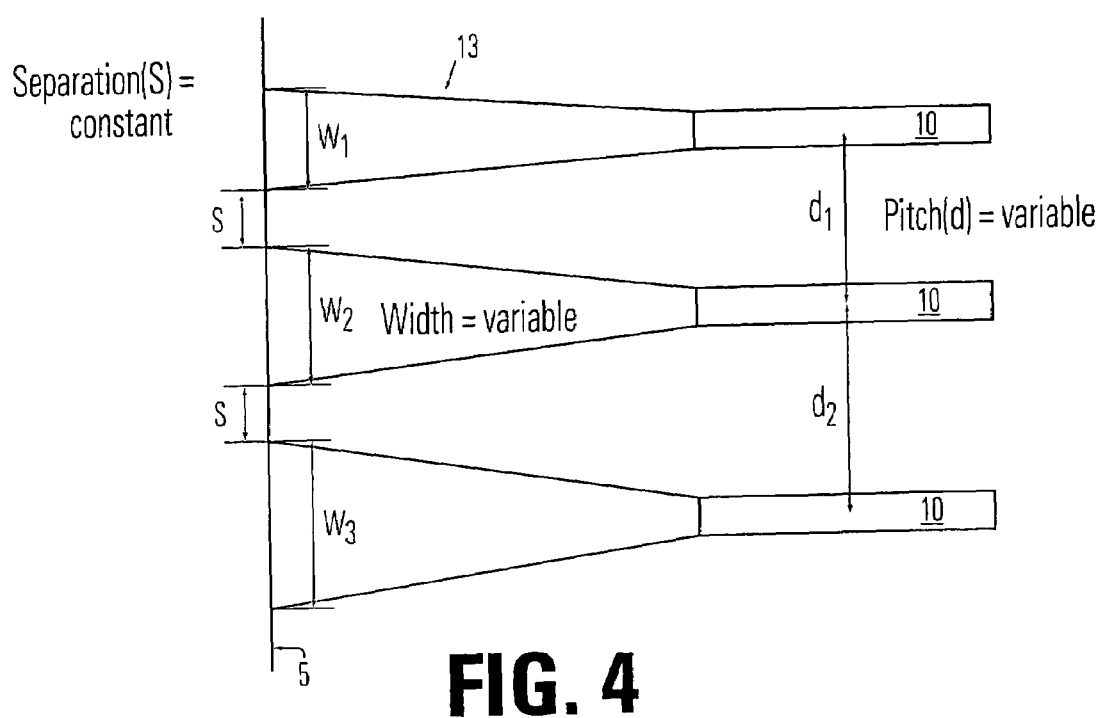
Figure 5:
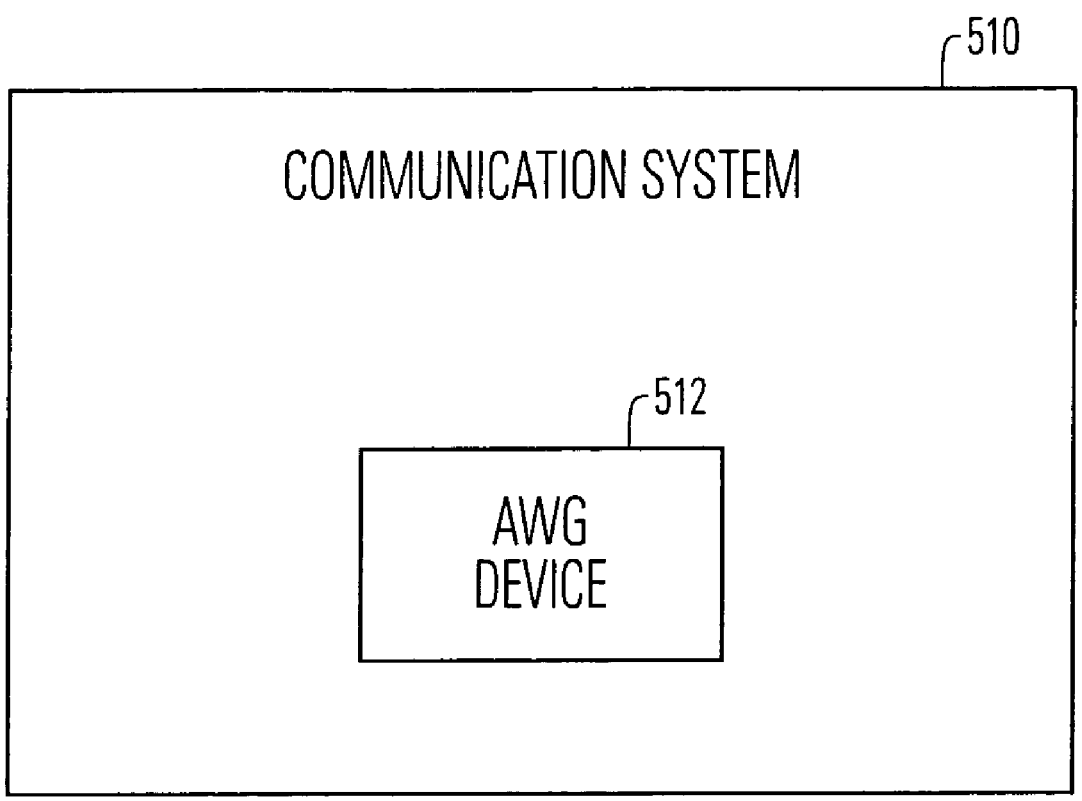
FIG. 5 illustrates a communications system incorporating an AWG according to the invention.

FIG. 4 illustrates one embodiment of the invention in which the separation (s) between adjacent tapered ends of the output waveguides 10, at the second slab coupler 4, is kept constant rather than keeping the width (W) of the tapered ends constant as in the prior at devices. As illustrated in FIG. 4, the pitch ($d_1$, $d_2$, . . .) between adjacent output waveguides 10 is still varied in known manner, generally increasing from the highest frequency channel (channel 40) down to the lowest frequency channel (channel 1), but the width ($W_1$, $W_2$, $W_3$, . . .)of the adiabatic tapers, where they are connected to the second slab coupler 4, is increased with the increasing pitch (d), so that the separation (s) between the ends (at the second slab coupler 4) is kept constant.

We have carried out BPM (Beam Propagation Method) simulations which support this proposed new configurations and arrangement of the tapers on the output waveguides.

BPM Simulation Result

The specifications were calculated for the central and outer channels (channels 1, 20 and 40). From the results, the "slope" in AXT across the receiver (i.e. output) waveguides, namely the difference between minimum and maximum AXT, and the worst-case AXT "spec" value were determined. The calculations were done firstly for a fixed taper width (W) of 14 μm and secondly for a fixed separation (s) between tapered ends (at the output slab) of 5 μm (i.e. taper width W varying from 14.4 to 13.6 μm from channel 1 to 40). The results are shown below:

|  | AXT [dB] | |
| --- | --- | --- |
|  | Slope | Spec |
| Fixed Taper width | 1.24 | −26.7 |
| Varied Taper Width, fixed separation (s) | 0.18 | −27.2 |

From these results, it is clear that varying the taper width (W) reduces the AXT slope across the channels: the slope reduces from 1.24 dB to only 0.18 dB. This approaches the ideal "flat line" graph of AXT illustrated by plot line G2 in FIG. 3. At the same time, the AXT "spec" (i.e. worst case) value reduces (i.e. improves) by about 0.5 dB.

Conclusion

The slope in AXT can be compensated for by adjusting the width of the tapered ends of the output waveguides so as to equalize the AXT across all the output waveguides. One simple way of substantially achieving this in the case where the pitch of the output waveguide varies across the array is to vary the taper width (W) so as to keep the separation (s) between the taper ends constant. BPM calculations show that (overall) AXT is improved by around 0.5 dB, while the other specs are hardly affected It will be appreciated that the above-described AWG, although described with reference to its use as a demultiplexer, could equally be used as a multiplexer. Therefore, the terms "input" and "output" as used above are not intended to be limiting, and would be interchanged where the device is used as a multiplexer.

Further modifications and variations to the above described embodiments are possible without departing from the scope of the invention. For example, in some cases the use of the input waveguide 2 may not be necessary. Instead, the input (multiplexed) optical signal may be input directly to the first slab coupler 3. In other cases, for example where the AWG is intended to be used as a router and therefore has multiple input waveguides 2, the input waveguides may have similarly tapered ends (at the first slab coupler) in which the width of the tapers is also varied so as to substantially equalise AXT across the input waveguides. For example, if the input waveguides 2 are designed so that the pitch (d) therebetween varies then the width of their tapered ends can also be varied so as to keep the separation (s) between the tapered ends constant.

It will be appreciated that the above described embodiment, in which the separation (s) between tapered ends is kept constant, is just one example of the invention. In other possible embodiments further adjustment of the output Waveguide taper width (W) may be necessary in order to compensate for variation in AXT across the output waveguides caused by factors other than variation in pitch thereof. In such cases the designer will adjust the individual taper widths as necessary in order to equalize, or substantially equalize, AXT across all the output waveguides.

Also, in other possible embodiments of the invention the widths (W) of the tapers on the output waveguides are varied appropriately so as to substantially equalize, or at least achieve more uniformity in, one or more other performance parameters of the AWG, such as Bandwidth, PDL, insertion loss and/or passband uniformity, as already mentioned. Additionally, if desired the tapered input waveguides (where provided) may also have the widths of their tapered ends adjusted so as to substantially equalize, or at least improve uniformity in, at least one or more performance parameters of the AWG across the input waveguides thereof. This may be useful where, for example, the AWG device will be used as a router.

The invention claimed is:

1. An arrayed waveguide grating (AWG) device comprising:

a substrate having first and second slab couplers;

a first array of waveguides optically coupled between the first and second slab couplers and having respective predetermined optical path length differences therebetween;

a second array of waveguides optically coupled at first ends thereof to an input/output side of the second slab coupler, the waveguides of the second array being substantially tapered at first end portions thereof so as to increase in width towards the second slab coupler;

wherein the pitch between adjacent waveguides of the second array varies across the second array and the width of said first ends of the waveguides varies across the second array so as to keep the distances between adjacent edges of adjacent waveguides at the first end in the direction perpendicular to the waveguide axis substantially constant across the second array of waveguides.

2. An AWG device according to claim 1, wherein the width of said first ends of the waveguides increases from one side of the second waveguide array to the other.

3. An AWG device according to claim 1, wherein the pitch between adjacent waveguides of the second array decreases from the lowest frequency channel waveguide to the highest frequency channel waveguide.

4. An AWG device according to claim 1, wherein each waveguide of the second array is tapered adiabatically at the first end portion thereof.

5. An AWG device according to claim 1, wherein the input/output waveguides widen towards the second slab coupler in non-continuous fashion.

6. An AWG device according to claim 1 wherein the output waveguides are all substantially single-mode waveguides.

7. An AWG device according to claim 1, wherein the AWG device further includes at least one input/output waveguide optically coupled at a first end thereof to an input/output side of the first slab coupler.

8. An AWG device according to claim 7, wherein an array of input/output waveguides is optically coupled at first ends thereof to the input/output side of the first slab coupler, the pitch of these input/output waveguides being varied across the array, and the waveguides being substantially tapered at first end portions thereof, and wherein the width of said first ends thereof is also varied so as to improve uniformity in at least one performance parameter across all the input/output waveguides.

9. A multiplexer/demultiplexer comprising an AWG device according to claim 1.

10. A communications system incorporating at least one AWG device according to claim 1.

11. A method of designing an AWG device comprising the steps of:

providing a substrate;

providing on the substrate first and second slab couplers, a first array of waveguides optically coupled between the first and second slab couplers and having respective predetermined optical path length differences therebetween, and a second array of waveguides optically coupled at first ends thereof to an input/output side of the second slab coupler, the waveguides of the second array being substantially tapered at first end portions thereof so as to increase in width towards the second slab coupler, wherein the pitch between adjacent waveguides of the second array varies across the second array and the width of said first ends of the waveguides varies across the second array so as to keep the distances between adjacent edges of adjacent waveguides at the first end in the direction perpendicular to the waveguide axis substantially constant across the second array of waveguides.

* * * * *